(12) United States Patent
Ichikawa et al.

(10) Patent No.: US 7,056,076 B2
(45) Date of Patent: Jun. 6, 2006

(54) METHOD OF AND APPARATUS FOR TRANSFERRING ROLLS, AND ROLL SUPPLY CARRIAGE

(75) Inventors: Haruo Ichikawa, Minamiashigara (JP); Akira Wakabayashi, Minamiashigara (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 667 days.

(21) Appl. No.: 09/996,974

(22) Filed: Nov. 30, 2001

(65) Prior Publication Data

US 2002/0067979 A1    Jun. 6, 2002

(30) Foreign Application Priority Data

Dec. 4, 2000 (JP) ............................ 2000-368991
Aug. 2, 2001 (JP) ............................ 2001-235379

(51) Int. Cl.
*B21C 37/30* (2006.01)

(52) U.S. Cl. ................. 414/226.04; 414/910; 414/806; 242/563

(58) Field of Classification Search ............. 242/559.3, 242/563; 414/226.04, 222.04, 225.01, 277, 414/684, 331.08, 334, 806, 910, 911
See application file for complete search history.

(56) References Cited

U.S. PATENT DOCUMENTS

| | | | | | |
|---|---|---|---|---|---|
| 1,182,905 | A | * | 5/1916 | Hamilton et al. | 464/104 |
| 1,907,447 | A | * | 5/1933 | Schlitz | 279/16 |
| 4,290,734 | A | * | 9/1981 | Van Breen | 414/800 |
| 4,557,515 | A | * | 12/1985 | Read | 294/67.22 |
| 4,687,244 | A | * | 8/1987 | Cullen et al. | 294/86.41 |
| 4,953,805 | A | * | 9/1990 | Rauh | 242/559.1 |
| 5,267,903 | A | * | 12/1993 | Kuribayashi | 464/104 |
| 5,299,751 | A | * | 4/1994 | Pichlmair et al. | 242/571 |
| 5,332,351 | A | * | 7/1994 | Nelson et al. | 414/684 |
| 5,466,114 | A | * | 11/1995 | Swain | 414/746.5 |
| 6,056,232 | A | * | 5/2000 | Karaki et al. | 242/559.3 |
| 6,093,005 | A | * | 7/2000 | Nakamura | 418/55.1 |

FOREIGN PATENT DOCUMENTS

| | | |
|---|---|---|
| JP | 53-51371 | 5/1978 |
| JP | 7-34759 | 2/1995 |

* cited by examiner

*Primary Examiner*—Eileen D. Lillis
*Assistant Examiner*—Charles A. Fox
(74) *Attorney, Agent, or Firm*—Sughrue Mion, PLLC

(57) ABSTRACT

After a roll supply carriage housing rolls in a light-shielded case is coupled to a film manufacturing apparatus, shutters are opened, and a roll retainer shaft and a roll loading shaft are connected to each other. A motor in a roll transferring apparatus is energized to transfer one of the rolls into the roll transferring apparatus. Then, a rotary table is turned to supply the transferred roll to a given region in the film manufacturing apparatus.

12 Claims, 20 Drawing Sheets

US 7,056,076 B2

METHOD OF AND APPARATUS FOR TRANSFERRING ROLLS, AND ROLL SUPPLY CARRIAGE

BACKGROUND OF THE INVENTION

1. Field of the Invention

The present invention relates to a method of and an apparatus for transferring a plurality of rolls, and a roll supply carriage.

2. Description of the Related Art

For manufacturing photographic films of photosensitive material, there are required a number of processes including a process of producing a wide elongate sheet-like film, a process of winding the sheet-like film into a roll, and a process of cutting the roll into strips and accommodating the strips in cases, thus manufacturing desired films. These processes are generally performed on different production lines, with intermediate products being required to be fed in a light-shielded fashion between the processes.

One conventional apparatus for supplying rolls to a film production apparatus is disclosed in Japanese laid-open patent publication No. 53-51371, for example. According to the disclosed apparatus, a plurality of rolls are retained on a roll retainer shaft, and pushed, one at a time, to the film production apparatus by an actuator. Since the rolls are of a photosensitive material, they are transferred to and from the roll retainer shaft in a dark chamber.

A mechanism for holding a film production apparatus in a light-shielded fashion is disclosed in Japanese laid-open patent publication No. 7-34759, for example. The disclosed mechanism is associated with a light-shielding door applicable to a supply opening for supplying rolls therethrough. The disclosed mechanism comprises a labyrinth structure disposed around the peripheral edges of the door to prevent external light from entering through the supply opening into the film production apparatus.

SUMMARY OF THE INVENTION

It is a general object of the present invention to provide a method of and an apparatus for transferring rolls automatically and reliably without human intervention.

A major object of the present invention is to provide a method of and an apparatus for transferring rolls while preventing the rolls from being skewed while they are being transferred.

A general object of the present invention to provide a roll supply carriage which is of a simple structure and requires no special drive mechanism.

A principal object of the present invention is to provide a roll supply carriage which is capable of supplying rolls by being actuated from an apparatus to which the rolls are to be transferred.

Another principal object of the present invention is to provide a roll supply carriage which is capable of selectively holding rolls in a fixed state and releasing rolls from a fixed state by being actuated from an apparatus to which the rolls are to be transferred.

Still another principal object of the present invention is to provide a roll supply carriage which is capable of easily transferring rolls of a photosensitive material in a bright chamber.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
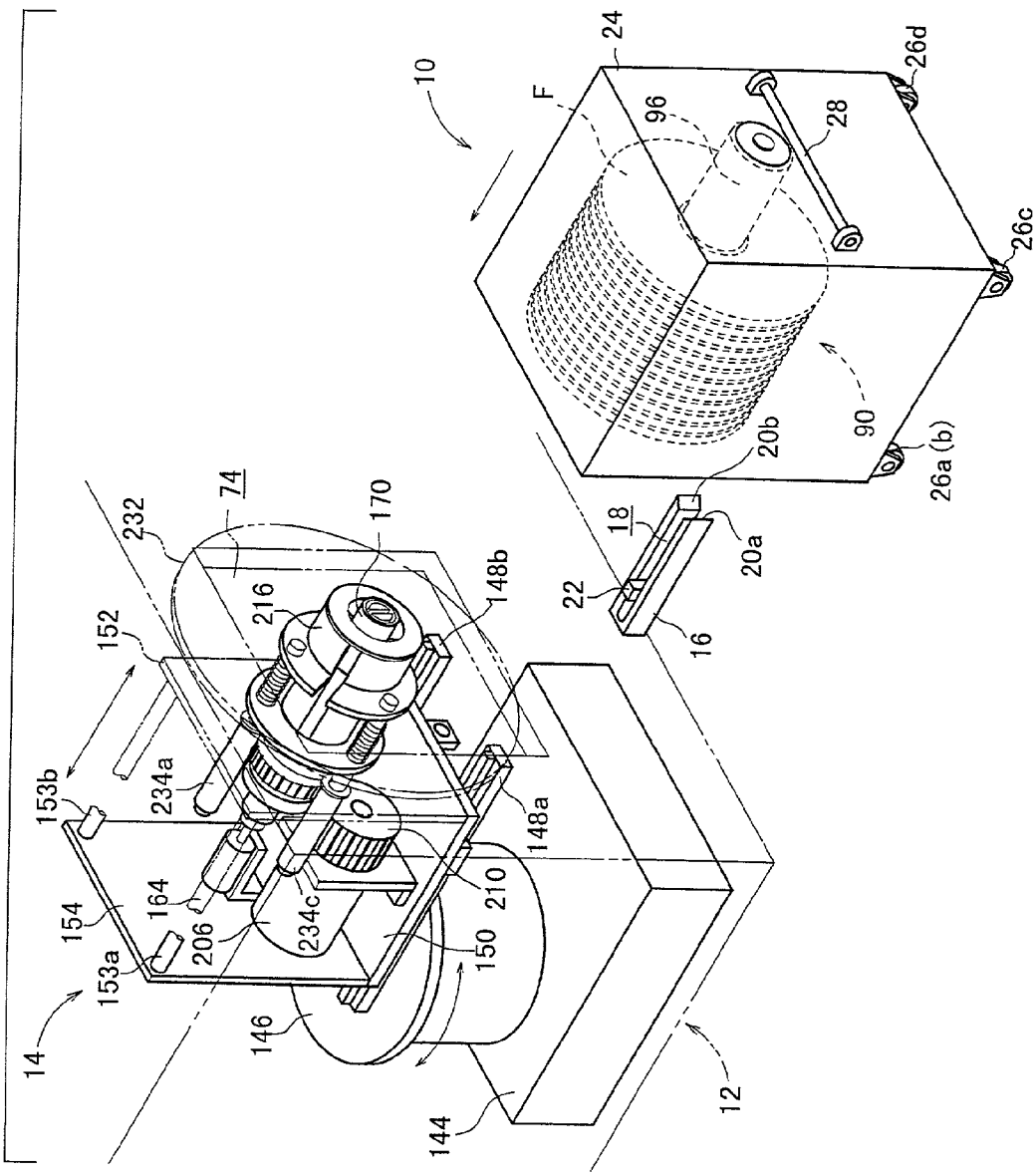
FIG. 1 is a perspective view of a roll supply carriage and a roll transferring apparatus according to the present invention.

FIG. 1 shows a roll supply carriage 10 for supplying rolls F each made of a photosensitive material and a roll transferring apparatus 14 disposed in a film manufacturing apparatus 12 provided in a dark chamber, for transferring the rolls F from the roll supply carriage 10 into the film manufacturing apparatus 12.

Between the roll supply carriage 10 and the roll transferring apparatus 14, there is disposed a guide member 16 on a floor for guiding the roll supply carriage 10 to a predetermined position on the film manufacturing apparatus 12. The guide member 16 has a groove 18 defined therein which extends toward the film manufacturing apparatus 12. The groove 18 is open at one end of the guide member 16 which has a pair of tapered surfaces 20a, 20b for introducing the roll supply carriage 10. A fixing bar 22 for fixing the roll supply carriage 10 to the guide member 16 is disposed linearly movably in the groove 18 near the other end of the guide member 16.

Figure 2:
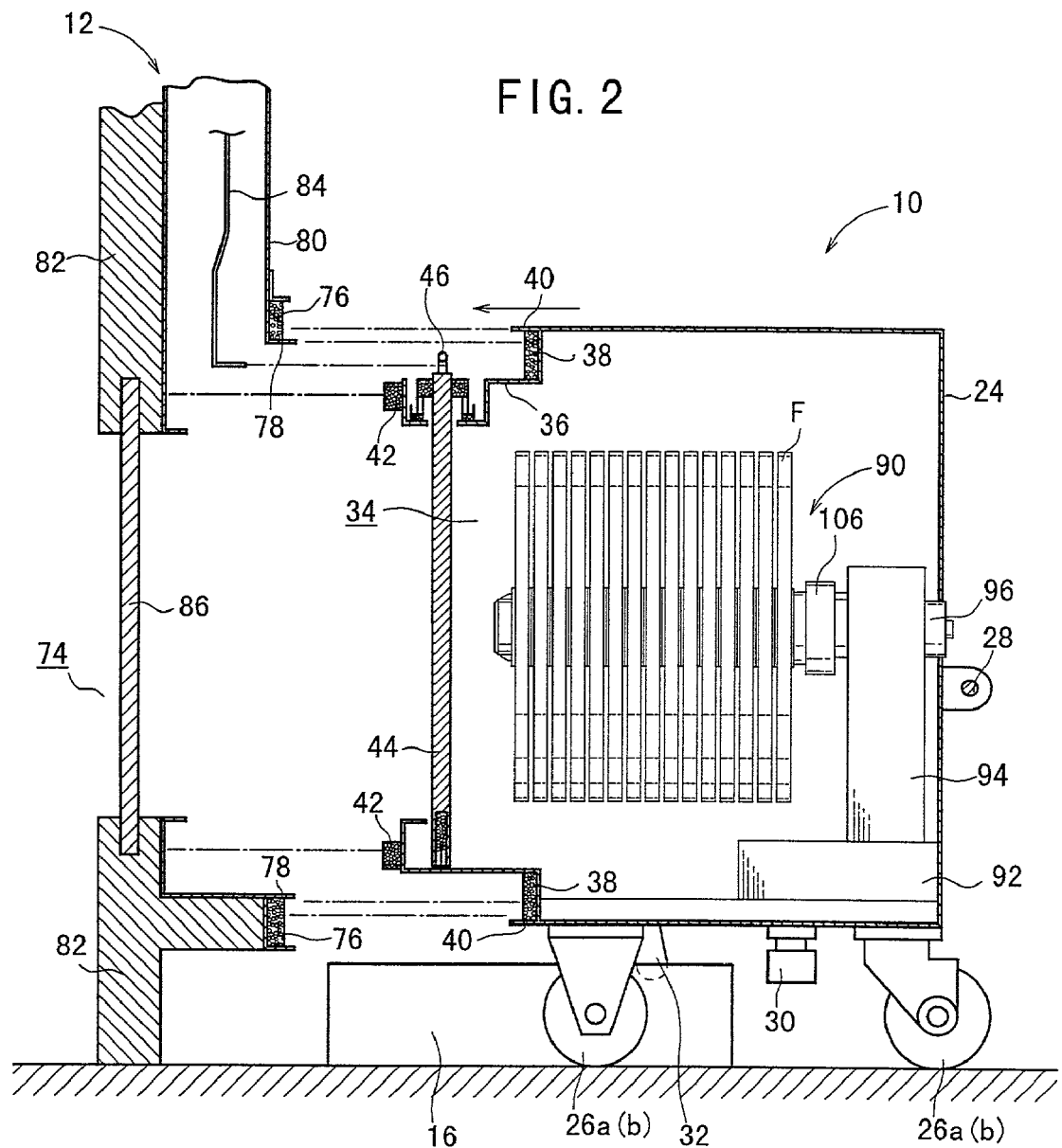
FIG. 2 is a sectional side elevational view of the roll supply carriage.

The roll supply carriage 10 has a box-shaped light-shielded case 24 having wheels 26a through 26d on its lower panel for moving the roll supply carriage 10. The operator can hold a grip 28 on a rear panel of the case 24 and move the roll supply carriage 10 as the wheels 26a through 26d roll on the floor. As shown in FIG. 2, a guide roller 30 for guiding the roll supply carriage 10 to the guide member 16 is disposed centrally on the lower panel of the case 24. A rod 32 for engaging the fixing bar 22 of the guide member 16 projects downwardly from the lower panel of the case 24 between the guide roller 30 and a front panel of the case 24.

Figure 3:
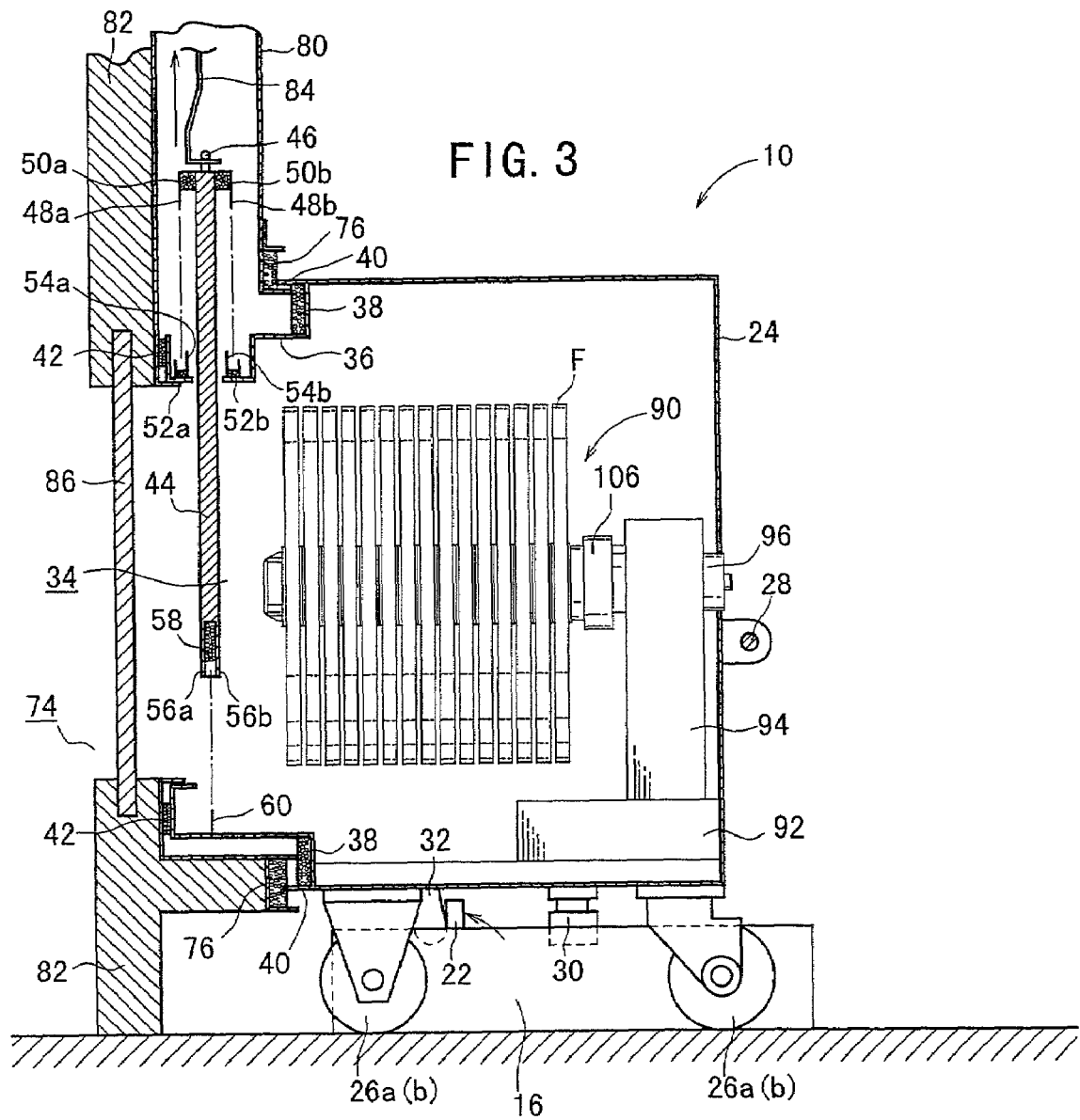
FIG. 3 is a sectional side elevational view of the roll supply carriage which is coupled to the roll transferring apparatus.
Figure 4:
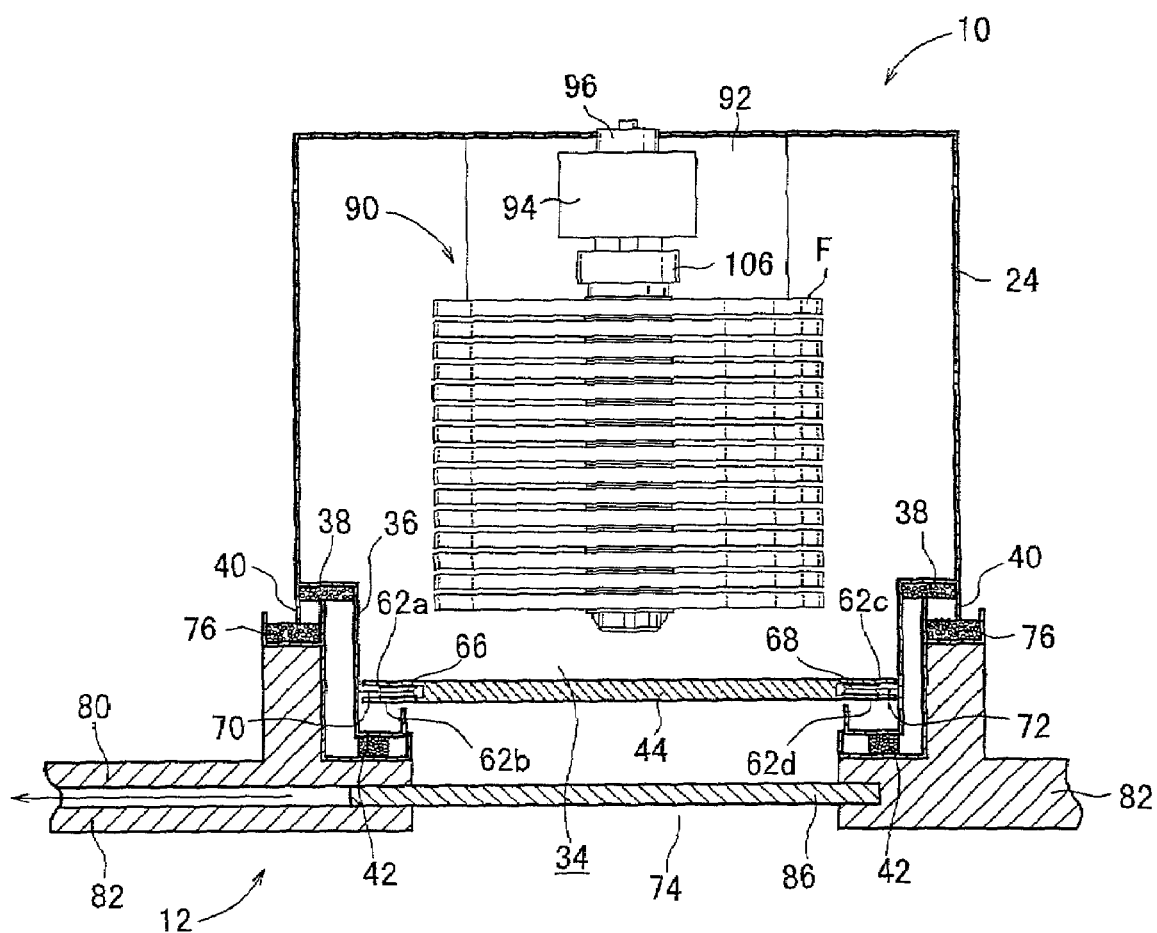
FIG. 4 is a sectional plan view of the roll supply carriage which is coupled to the roll transferring apparatus.
Figure 5:
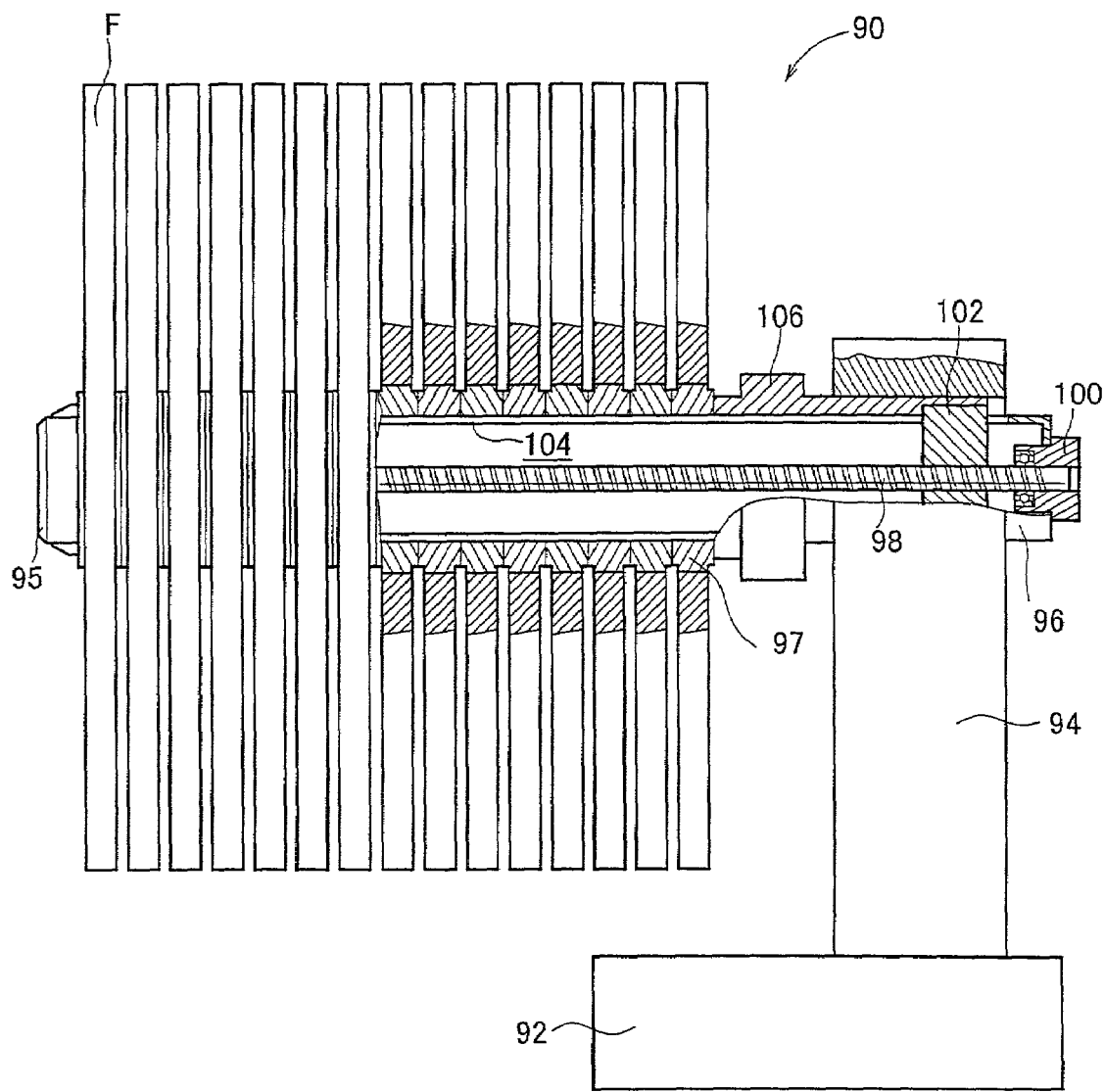
FIG. 5 is a side elevational view, partly in cross section, of a roll holding mechanism in the roll supply carriage.

As shown in FIGS. 2 through 4, the front panel of the roll supply carriage 10 has an unloading opening 34 defined therein for unloading the rolls F from the roll supply carriage 10. The unloading opening 34 has an inner end surrounded by a step 36 on which there is mounted a resilient member 38 having a light-shielding capability and a damping capability. The step 36 is surrounded by a projection 40 projecting toward the film manufacturing apparatus 12. The unloading opening 34 has an outer end facing the film manufacturing apparatus 12 and surrounded by another resilient member 42 having a light-shielding capability and a damping capability.

A light-shielding shutter 44 is disposed in the unloading opening 34. The shutter 44 has a grip 46 on its upper end and a pair of resilient members 50a, 50b (see FIG. 3), each having a light-shielding capability and a damping capability, on respective opposite sides of the upper end thereof and a pair of protrusions 48a, 48b combined with the respective resilient members 50a, 50b. An upper edge which defines the unloading opening 34 supports thereon a pair of resilient members 52a, 52b and a pair of protrusions 54a, 54b which are disposed downwardly of the resilient members 50a, 50b and the protrusions 48a, 48b, respectively. The shutter 44 has a pair of protrusions 56a, 56b on its lower end with a resilient member 58 disposed between the protrusions 56a, 56b. As shown in FIG. 3, a protrusion 60 is disposed on a lower edge which defines the unloading opening 34 in vertical alignment with the resilient member 58. As shown in FIG. 4, the shutter 44 has a pair of protrusions 62a, 62b on one side and another pair of protrusions 62c, 62d on the other side, with rollers 66, 68 being disposed between the protrusions 62a, 62b and between the protrusions 62c, 62d. The rollers 66, 68 engage projecting guides 70, 72, respectively, which are disposed on side edges which define the unloading opening 34.

As shown in FIGS. 3 and 4, the film manufacturing apparatus 12 has an outer peripheral wall 80 and an inner peripheral wall 82 spaced from each other for coaction with the shutter 44. When the roll supply carriage 10 and the film manufacturing apparatus 12 are coupled to each other, the case 24 and the outer and inner peripheral walls 80, 82 jointly make up a light-shielding labyrinth structure.

The film manufacturing apparatus 12 which confronts the roll supply carriage 10 has a loading opening 74 defined in the inner peripheral wall 82 for loading rolls F therethrough into the film manufacturing apparatus 12. The loading opening 74 is surrounded by a resilient member 76 having a light-shielding capability and a damping capability. The resilient member 76 is mounted on the outer peripheral wall 80 and horizontally aligned with the projection 40 of the roll supply carriage 10. A protrusion 78 (see FIG. 2) is also mounted on the outer peripheral wall 80 adjacent to the resilient member 76 and horizontally aligned with the resilient member 48 of the roll supply carriage 10. A shutter opening/closing member 84 is disposed in the gap that is defined between the outer peripheral wall 80 and the inner peripheral wall 82 above the loading opening 74. When the roll supply carriage 10 and the film manufacturing apparatus 12 are coupled to each other, the shutter opening/closing member 84 engages the grip 46 on the upper end of the shutter 44 to open or close the shutter 44. As shown in FIG. 4, a shutter 86 slidable in the directions perpendicular to the shutter 44 of the roll supply carriage 10 is disposed in the inner peripheral wall 82 of the film manufacturing apparatus 12.

Internal structural details of the roll supply carriage 10 will be described below with reference to FIGS. 5 through 8.

The roll supply carriage 10 accommodates therein a roll holding mechanism 90 for holding a plurality of rolls F. The roll holding mechanism 90 comprises a vertical support column 94 mounted on a base 92 in the case 24 and a horizontal roll retainer shaft 96 having one end fixed to the support column 94. A plurality of rolls F can be retained around the roll retainer shaft 96 by cores 97 of the rolls F. The roll retainer shaft 96 has tapered surfaces 95 on its other end for allowing rolls F to be installed on and removed from the roll retainer shaft 96 with ease.

The roll retainer shaft 96 is of a hollow cylindrical shape with a ball screw 98 coaxially centrally disposed therein. The ball screw 98, which serves as a moving mechanism, has an end rotatably supported on one end of the roll retainer shaft 96 by a bearing 100. A nut 102 is threaded over the ball screw 98. The roll retainer shaft 96 has a groove 104 defined longitudinally therein with the nut 102 movable in and along the groove 104. A moving member 106 is disposed around the roll retainer shaft 96 and coupled to the nut 102. When the moving member 106 is displaced axially along the roll retainer shaft 96 by the nut 102, the cores 97 are also displaced along the roll retainer shaft 96, moving the rolls F toward the film manufacturing apparatus 12.

Figure 6:
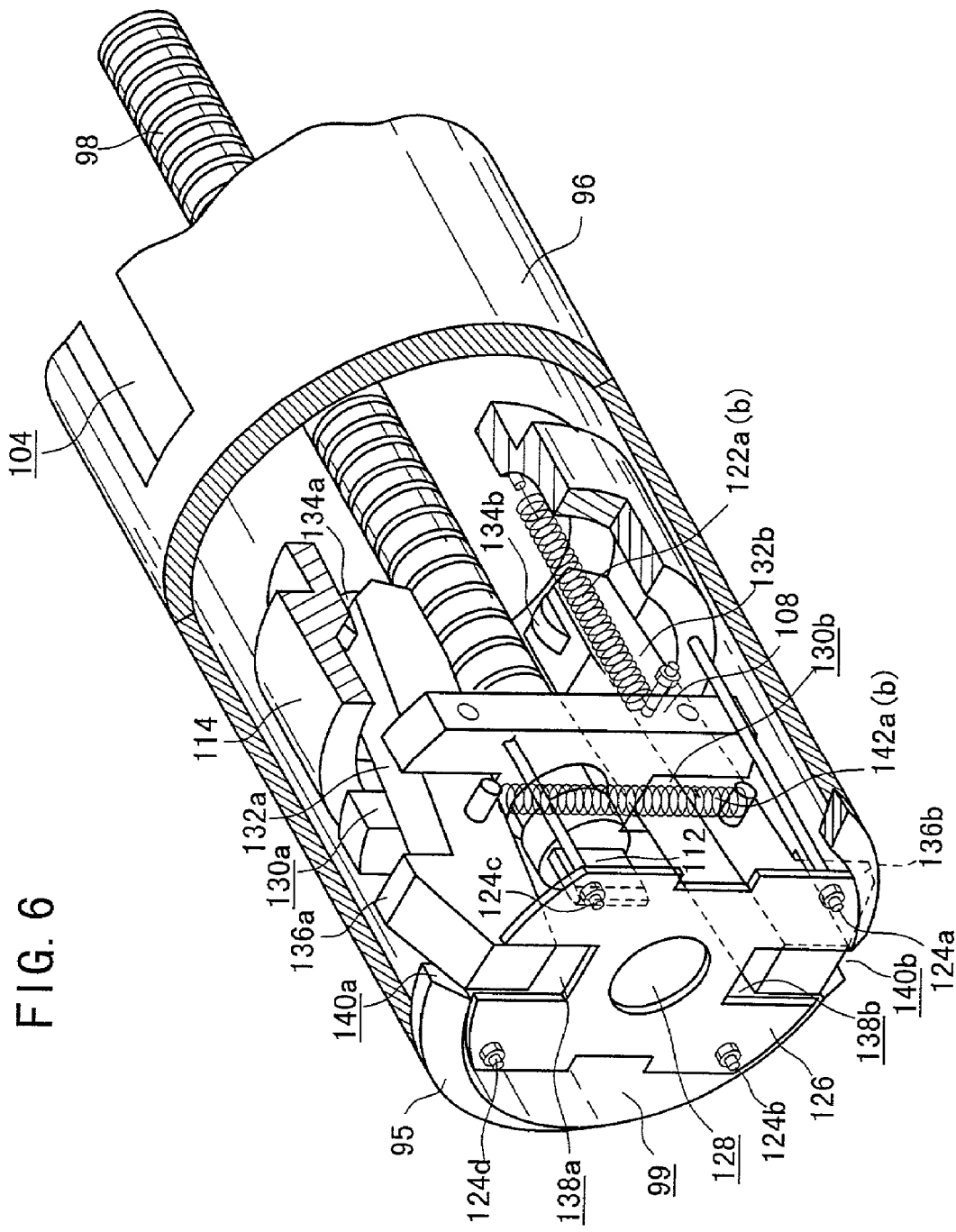
FIG. 6 is a perspective view, partly cut away, of a roll retainer shaft in the roll holding mechanism in the roll supply carriage.
Figure 7:
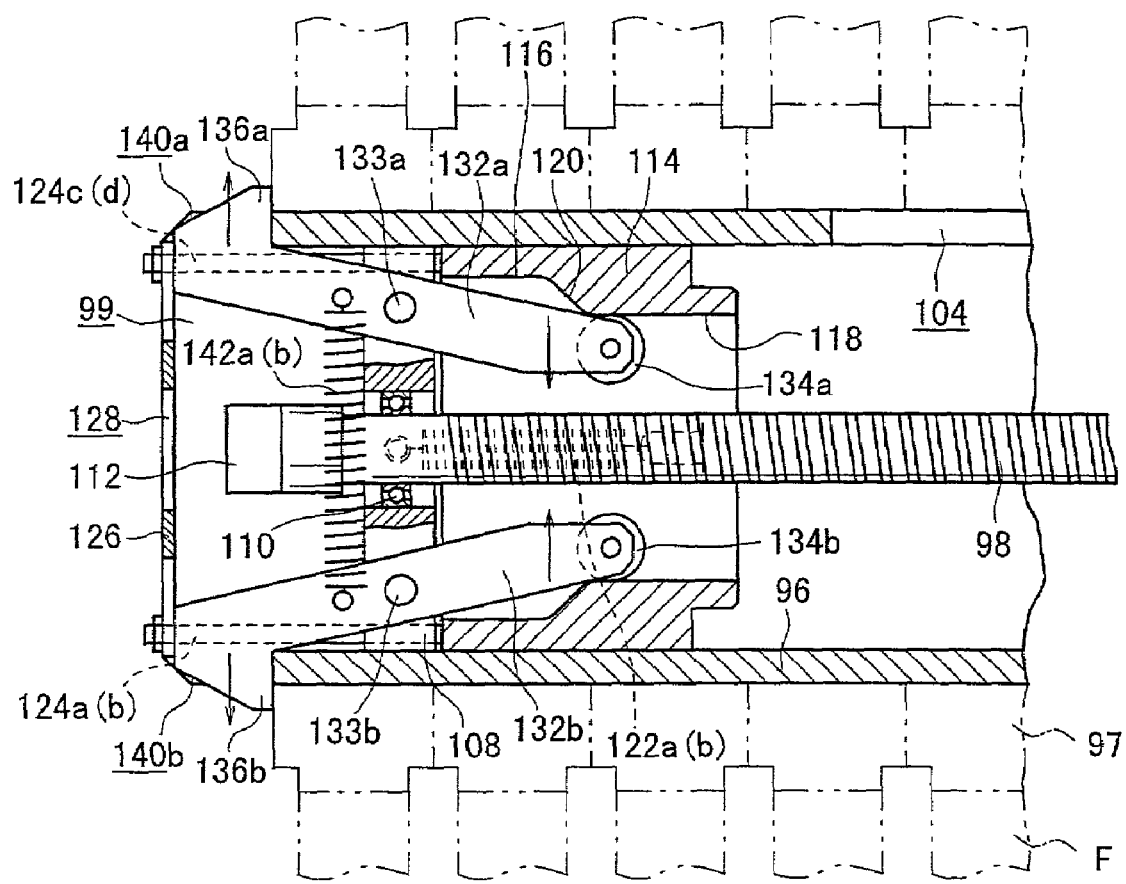
FIG. 7 is a cross-sectional view of the roll retainer shaft in the roll holding mechanism in the roll supply carriage.
Figure 8:
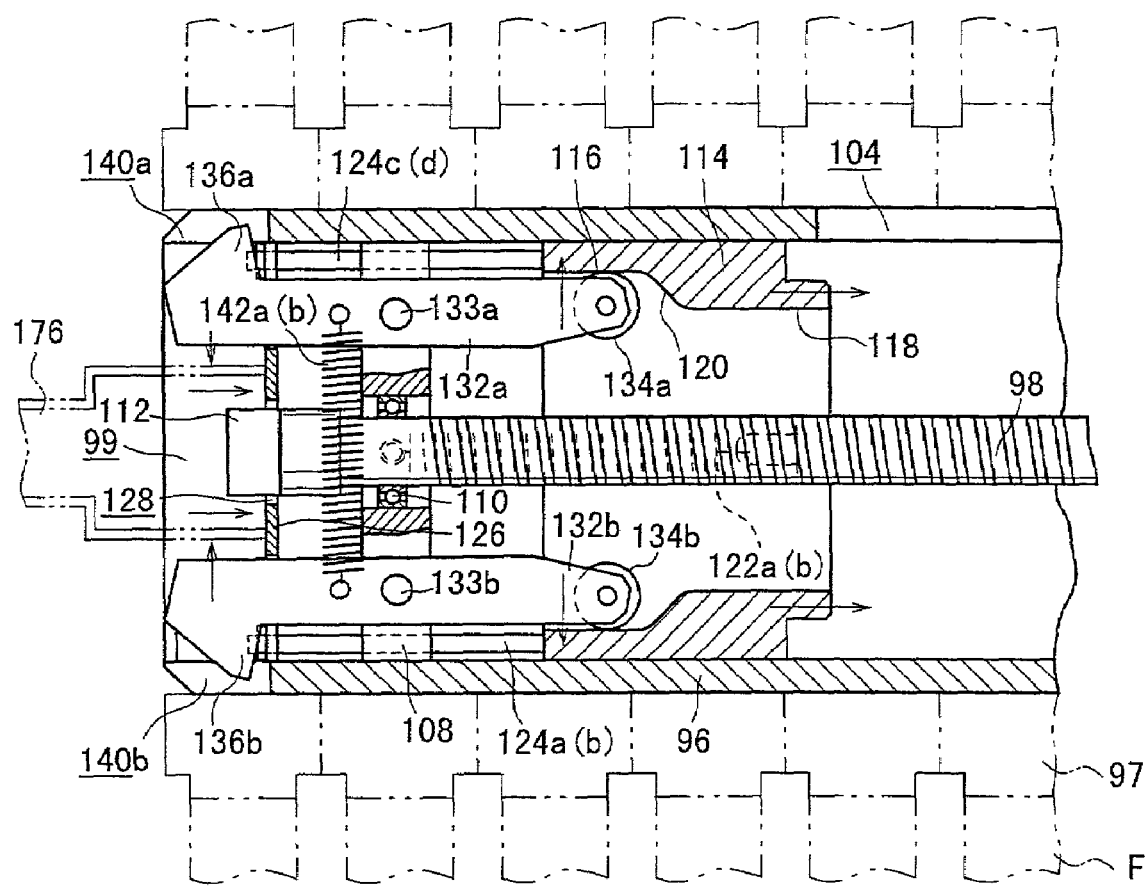
FIG. 8 is a cross-sectional view of the roll retainer shaft in the roll holding mechanism in the roll supply carriage.

The other end of the ball screw 98 is rotatably supported by a bearing 110 on a substantially H-shaped support 108 that is fixedly mounted in the other end of the roll retainer shaft 96 which is remote from the support column 94 (see FIGS. 6 through 8). A plate-shaped engaging member 112 is attached to the other end of the ball screw 98.

A cam 114 serving as a switching mechanism displaceable along the inner circumferential surface of the roll retainer shaft 96 is disposed on a side of the support 108. The cam 114 is in the form of a hollow cylinder having an inner circumferential surface as a larger-diameter surface 116 closer to the support 108, an inner circumferential surface as a smaller-diameter surface 118 closer to the support column 94, and a cam surface 120 extending between the larger-diameter surface 116 and the smaller-diameter surface 118. The cam 114 and the support 108 are joined to each other by springs 122a, 122b.

A plate member 126 (displacing means) is connected to an end face of the cam 114 near the larger-diameter surface 116 by four rods 124a through 124d. The plate member 126 is of a substantially H shape, and is disposed in an opening 99 defined in the other end of the roll retainer shaft 96. The plate member 126 has an opening 128 defined centrally therein for insertion therein of the engaging member 112 on the other end of the ball screw 98.

The substantially H-shaped support 108 has upper and lower recesses 130a, 130b (see FIG. 6) in which respective lock arms 132a, 132b (lock means) are pivotally supported for preventing the rolls F from being accidentally removed from the roll retainer shaft 96. Rollers 134a, 134b capable of rolling along the inner circumferential surface of the cam 114 are disposed on respective ends of the lock arms 132a, 132b. The other ends of the lock arms 132a, 132b have respective fingers 136a, 136b (finger members) for engaging the cores 97 of the rolls F. The fingers 136a, 136b are disposed in alignment with the respective upper and lower recesses 138a, 138b of the substantially H-shaped support 108, and can project radially outwardly of the roll retainer shaft 96 through slots 140a, 140b defined in the other end of the roll retainer shaft 96. The lock arms 132a, 132b are connected to each other at their portions near the fingers 136a, 136b by springs 142a, 142b which normally bias the fingers 136a, 136b to be accommodated in the roll retainer shaft 96.

Figure 9:
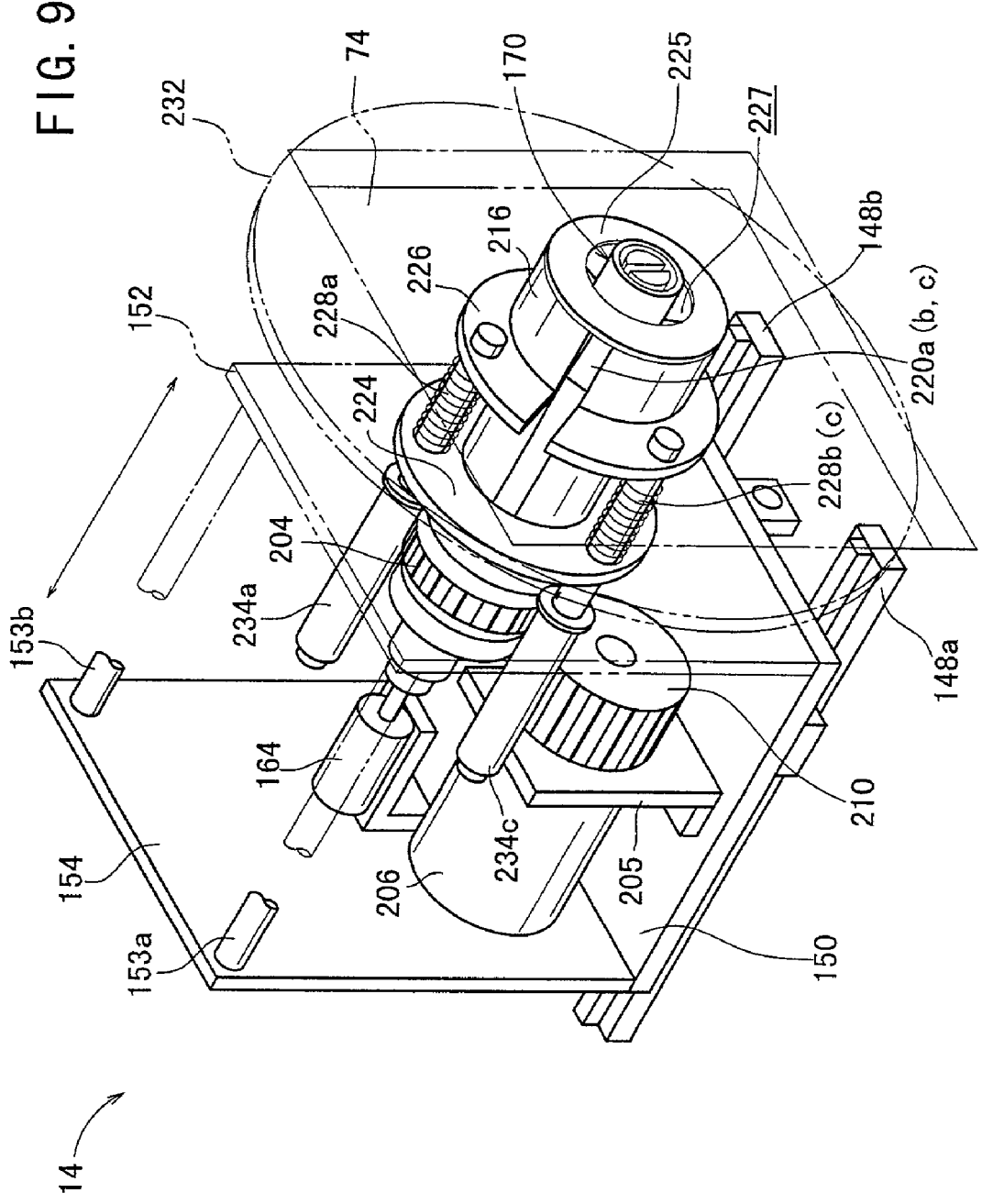
FIG. 9 is a perspective view of the roll transferring apparatus.
Figure 10:
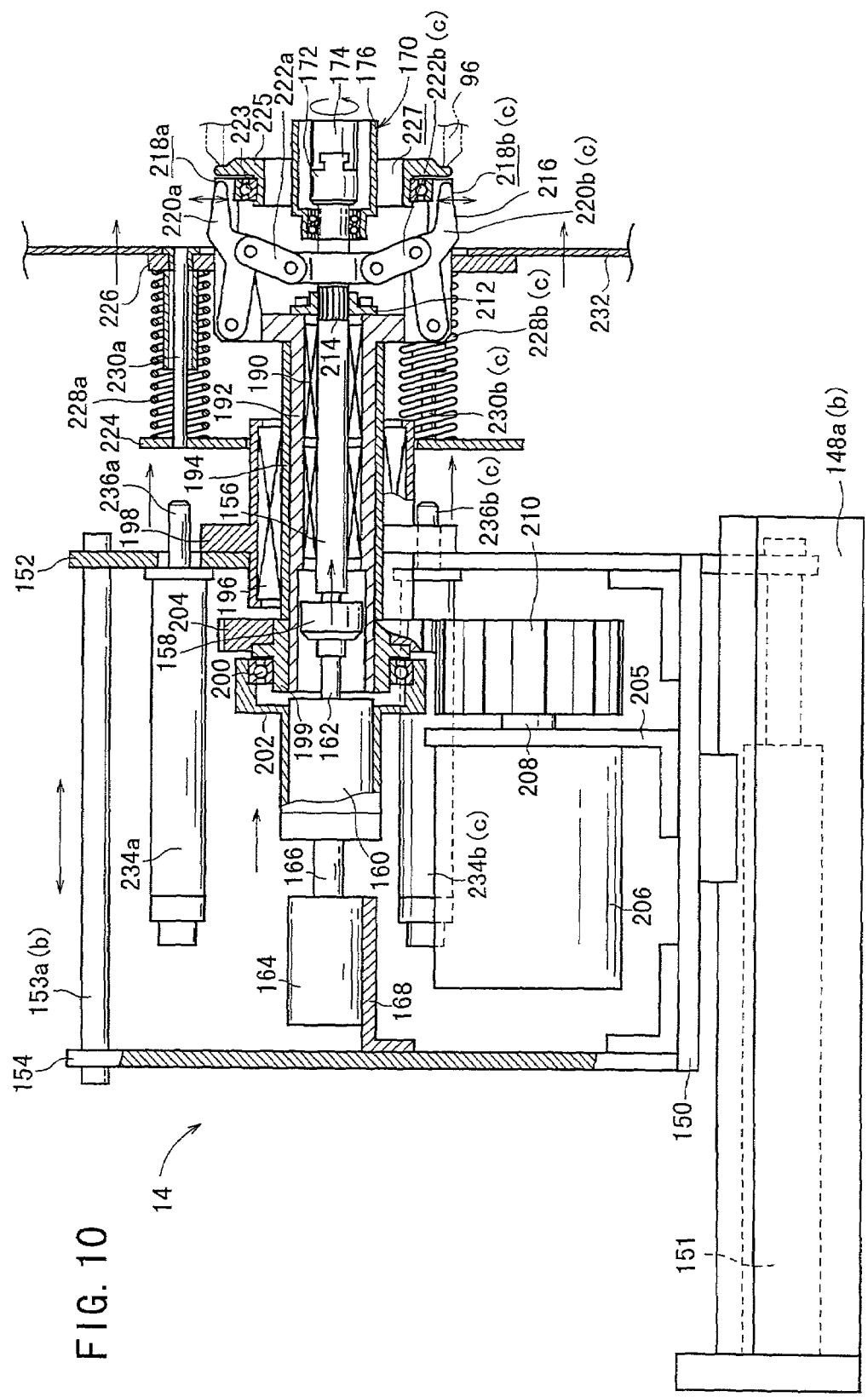
FIG. 10 is a side elevational view, partly in cross section, of the roll transferring apparatus.

Structural details of the roll transferring apparatus 14 will be described below with reference to FIGS. 1, 9, and 10.

As shown in FIG. 1, the roll transferring apparatus 14 is supported on a rotary table 146 disposed on a base 144. The rotary table 146 can turn the roll transferring apparatus 14 between a position near the roll supply carriage 10 and a roll transfer mechanism (not shown) in the film manufacturing apparatus 12. Guide rails 148a, 148b are disposed on the rotary table 146. The roll transferring apparatus 14 is mounted on a support base 150 movably mounted on the guide rails 148a, 148b, and is slidable along the guide rails 148a, 148b by a cylinder 151.

Two vertical support plates 152, 154, whose upper ends are connected by connecting bars 153a, 153b, are disposed on the support base 150. A rotatable shaft 156 is disposed centrally on the support plate 152 and has an end connected to a piston rod 162 of a first cylinder 160 through a coupling 158 by which the rotatable shaft 156 is rotatably supported. The first cylinder 160 is also connected to a piston rod 166 of a second cylinder 164 which is supported on the support plate 154 by a bracket 168.

Figure 11:
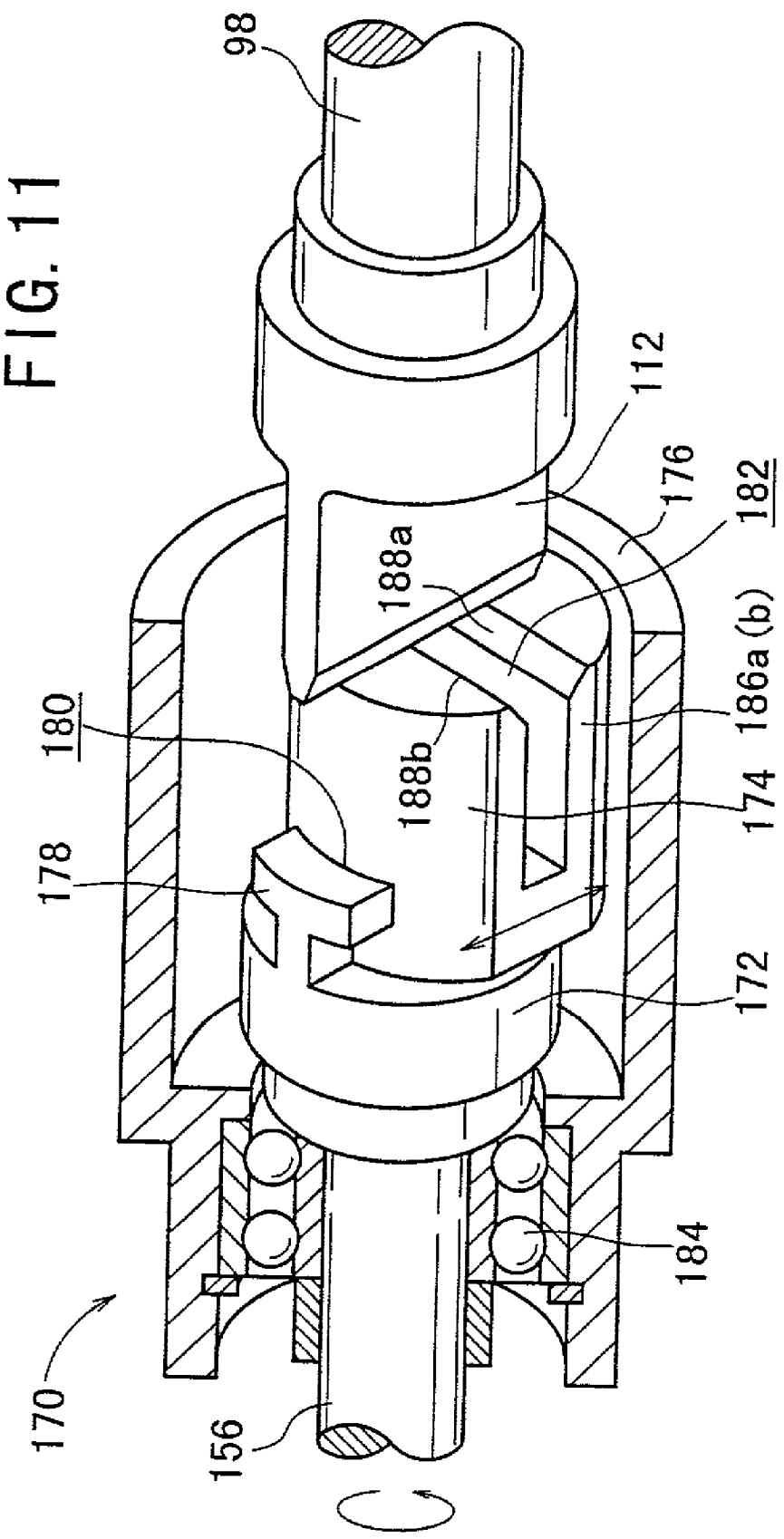
FIG. 11 is a perspective view, partly cut away, of an Oldham's coupling mechanism, before it is engaged, in the roll transferring apparatus.
Figure 12:
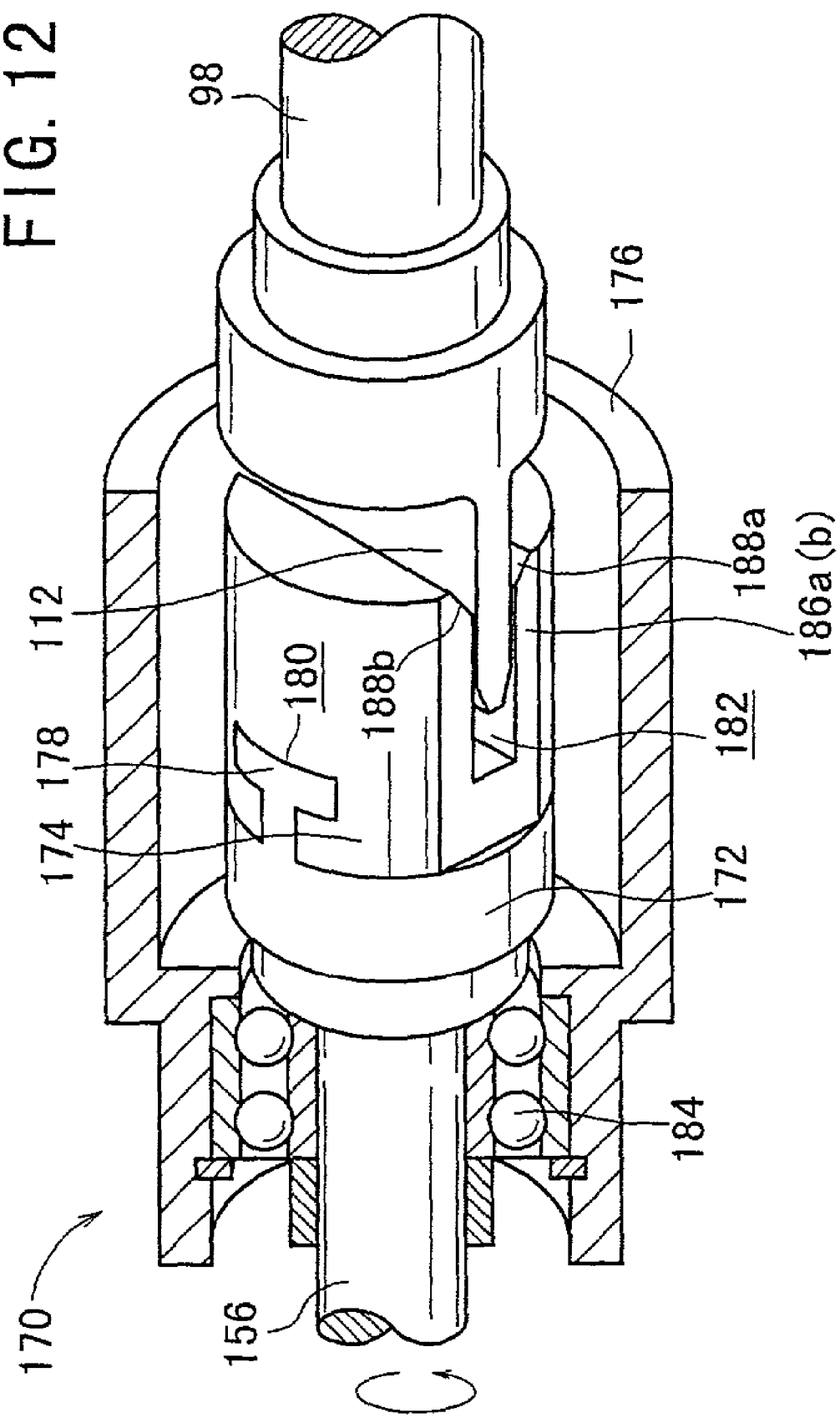
FIG. 12 is a perspective view, partly cut away, of the Oldham's coupling mechanism, after it is engaged, in the roll transferring apparatus.

An Oldham's coupling mechanism 170 is disposed on the other end of the rotatable shaft 156. As shown in FIGS. 11 and 12, the Oldham's coupling mechanism 170 basically comprises a hub 172 fixed to the tip end of the rotatable shaft 156, a slide element 174 engaging the hub 172, and a sleeve 176 (pressing member) disposed around the slide element 174.

The hub 172 has an engaging member 178 of a substantially T-shaped cross section. The slide element 174 has a groove 180 of a substantially T-shaped cross section in which the engaging member 178 is slidably fitted. The slide element 174 has a groove 182 defined therein for receiving therein the engaging member 112 on the tip end of the ball screw 98 of the roll supply carriage 10. The sleeve 176 is of a hollow cylindrical shape and is rotatably supported on the rotatable shaft 156 by a bearing 184.

Figure 13:
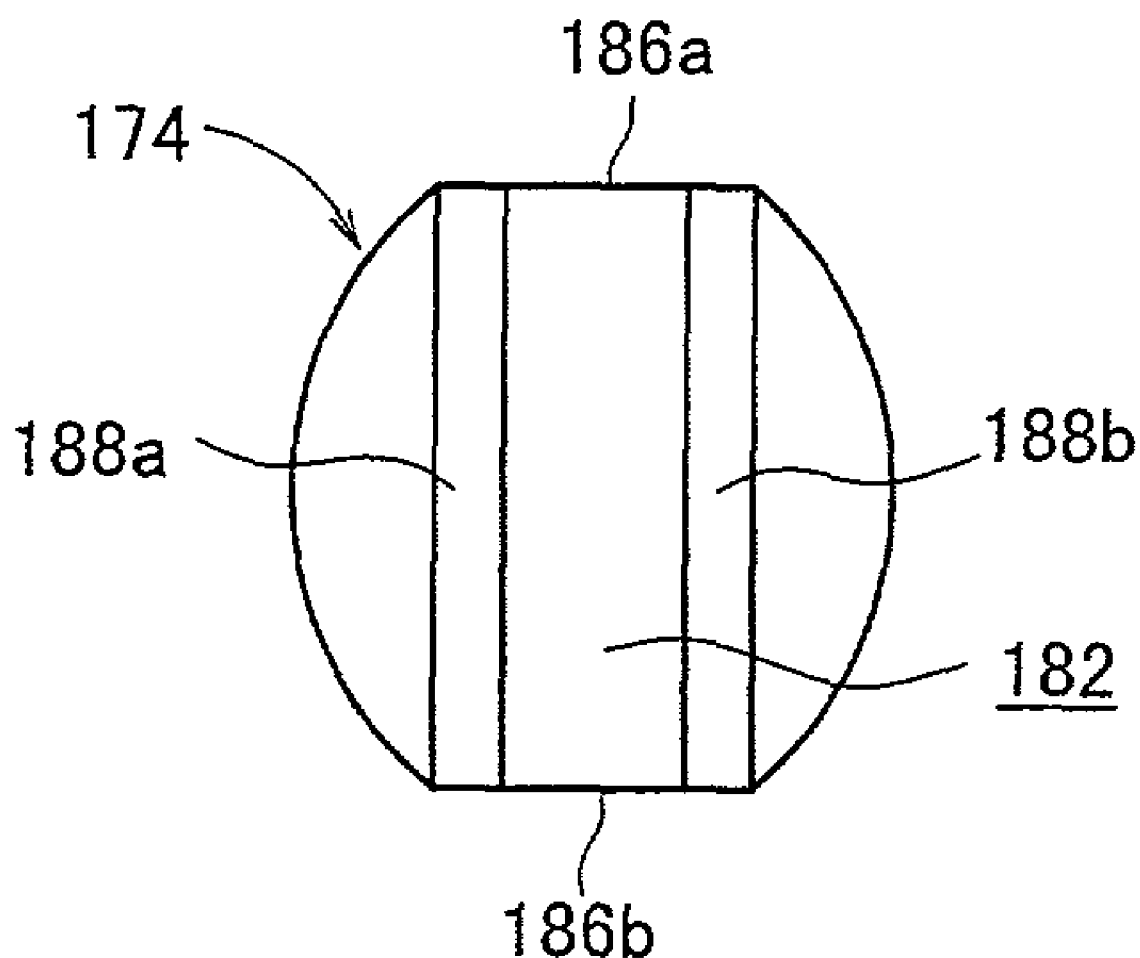
FIG. 13 is an elevational view of a tip end of the Oldham's coupling mechanism.

As shown in FIG. 13, the slide element 174 is not of a fully circular outer profile, but has flat surfaces 186a, 186b on opposite sides of the groove 182 for increased mechanical strength. The slide element 174 has a pair of tapered surfaces 188a, 188b at the open end of the groove 182 for allowing the engaging member 112 to be inserted easily into the groove 182.

A first sleeve 192 is mounted on the outer circumferential surface of the rotatable shaft 156 with a bushing 190 interposed therebetween. A second sleeve 194 is mounted on the outer circumferential surface of the first sleeve 192, and a holder member 198 is mounted on the second sleeve 194 with a bushing 196 interposed therebetween. The holder member 198 is fixedly mounted on the support plate 152, holding the second sleeve 194 for rotation with respect to the support plate 152.

A third sleeve 199 is mounted on the outer circumferential surface of the end of the first sleeve 192 near the first cylinder 160. A casing 202 on which the first cylinder 160 is supported is mounted on the third sleeve 199 by a bearing 200. A gear 204 is mounted on the third sleeve 199 and held in mesh with a gear 210 mounted on a drive shaft 208 of a motor 206 (rotating means) fixed to the support base 150 by a bracket 205. The rotation of the motor 206 is transmitted to the first sleeve 192 through the gears 210, 204.

An internal gear 212 is fixed to the end of the first sleeve 192 near the Oldham's coupling mechanism 170. The gear 212 is held in mesh with a spline portion 214 on the outer circumferential surface of the rotatable shaft 156. The rotation of the first sleeve 192 is transmitted to the rotatable shaft 156 through the spline portion 214.

A cylindrical roll loading shaft 216 is integrally formed with the end of the first sleeve 192 near the Oldham's coupling mechanism 170. The roll loading shaft 216 has three recesses 218a through 218c defined therein at angularly spaced intervals of 120° in the circumferential direction. Finger members 220a through 220c for holding rolls F are disposed respectively in the recesses 218a through 218c. The finger members 220a through 220c have respective ends pivotally supported on the roll loading shaft 216 and other ends that can project radially outwardly from the recesses 218a through 218c. The finger members 220a through 220c have respective intermediate portions connected to the rotatable shaft 156 by respective links 222a through 222c.

A rotary ring 225 is mounted on the tip end of the roll loading shaft 216 by a bearing 223. The rotary ring 225 serves to bear the tip end of the roll retainer shaft 96 of the roll supply carriage 10, and has an opening 227 defined centrally therein through which the Oldham's coupling mechanism 170 projects axially.

The roll loading shaft 216 and the rotary ring 225 have respective diameters smaller than the diameter of the roll retainer shaft 96 of the roll holding mechanism 90.

Holder plates 224, 226 are mounted respectively on the outer circumferential surfaces of the holder member 198 and the roll loading shaft 216. The holder plate 224 is displaceable axially along the outer circumferential surface of the holder member 198, and the holder plate 226 is fixed to the roll loading shaft 216. Between these holder plates 224, 226, there are disposed springs 228a through 228c under compression in respective positions between the finger members 220a through 220c. Rods 230a through 230c (support members) are inserted respectively through the springs 228a through 228c. The rods 230a through 230c have ends fixed to the holder plate 224 and other ends projecting through the holder plate 226 toward the roll supply carriage 10. A support plate 232 for preventing rolls F from collapsing while they are being transferred is fixed to the projecting other ends of the rods 230a through 230c.

Three cylinders 234a through 234c (support member displacing means) are fixed to the support plate 152 at angularly spaced intervals of 120°, and have respective piston rods 236a through 236c projecting through the support plate 152 toward the holder plate 224.

The roll supply carriage 10 and the roll transferring apparatus 14 are basically constructed as described above. Now, operation of the roll supply carriage 10 and the roll transferring apparatus 14 will be described below.

First, the roll supply carriage 10 with a plurality of rolls F held thereon is prepared. As shown in FIG. 7, the roll F disposed closest to the tip end of the roll retainer shaft 96 is prevented from being dislodged by the fingers 136a, 136b of the lock arms 132a, 132b which project radially outwardly from the grooves 140a, 140b in the roll retainer shaft 96.

As shown in FIG. 2, the unloading opening 34 in the case 24 is closed by the shutter 44. Specifically, the protrusions 48a, 48b on the upper end of the shutter 44 engage the respective resilient members 52a, 52b of the case 24, and the resilient member 58 on the lower end of the shutter 44 engages the protrusion 60 of the case 24. As shown in FIG. 4, the opposite sides of the shutter 44 engage the projecting guides 70, 72 of the case 24. With the shutter 44 being thus positioned, the rolls F in the case 24 are held in a light-shielded fashion.

The roll supply carriage 10 is then delivered to the loading opening 74 of the film manufacturing apparatus 12. The rod 32 and the guide roller 30 mounted on the lower panel of the roll supply carriage 10 are inserted into the groove 18 in the guide member 16 (see FIG. 2), after which the fixing bar 22 projects into engagement with the rod 32 to position the roll supply carriage 10 (see FIG. 3). At this time, the resilient member 42 around the unloading opening 34 in the case 24 abuts against the outer peripheral wall 80 of the film manufacturing apparatus 12, and the protrusion 40 of the case 24 engages the resilient member 76 on the outer peripheral wall 80. As a result, a light-shielded environment is established between the roll supply carriage 10 and the film manufacturing apparatus 12.

At the time the roll supply carriage 10 is coupled to the film manufacturing apparatus 12, the shutter opening/closing member 84 of the film manufacturing apparatus 12 engages the grip 46 on the upper end of the shutter 44 of the roll supply carriage 10 (see FIG. 3). Then, the shutter opening/closing member 84 is lifted to open the shutter 44. Then, the shutter 86 of the film manufacturing apparatus 12 is moved laterally, providing communication between the roll supply carriage 10 and the film manufacturing apparatus 12 while keeping the light-shielded environment therebetween.

A process of transferring the rolls F from the roll supply carriage 10 to the film manufacturing apparatus 12 will be described below with reference to FIGS. 14 through 18.

Figure 14:
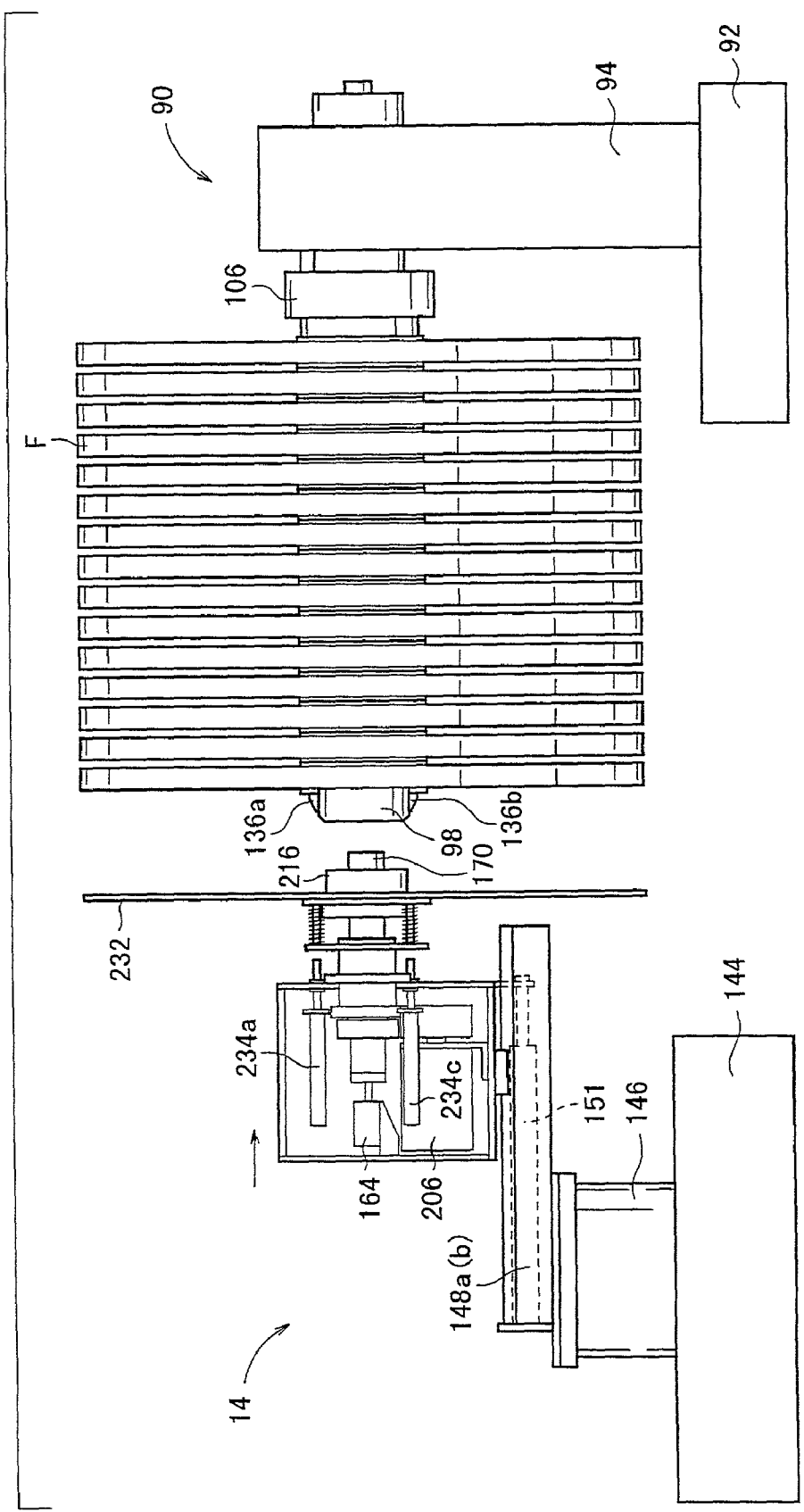
FIG. 14 is a side elevational view of the roll holding mechanism and the roll transferring apparatus which confront each other.
Figure 15:
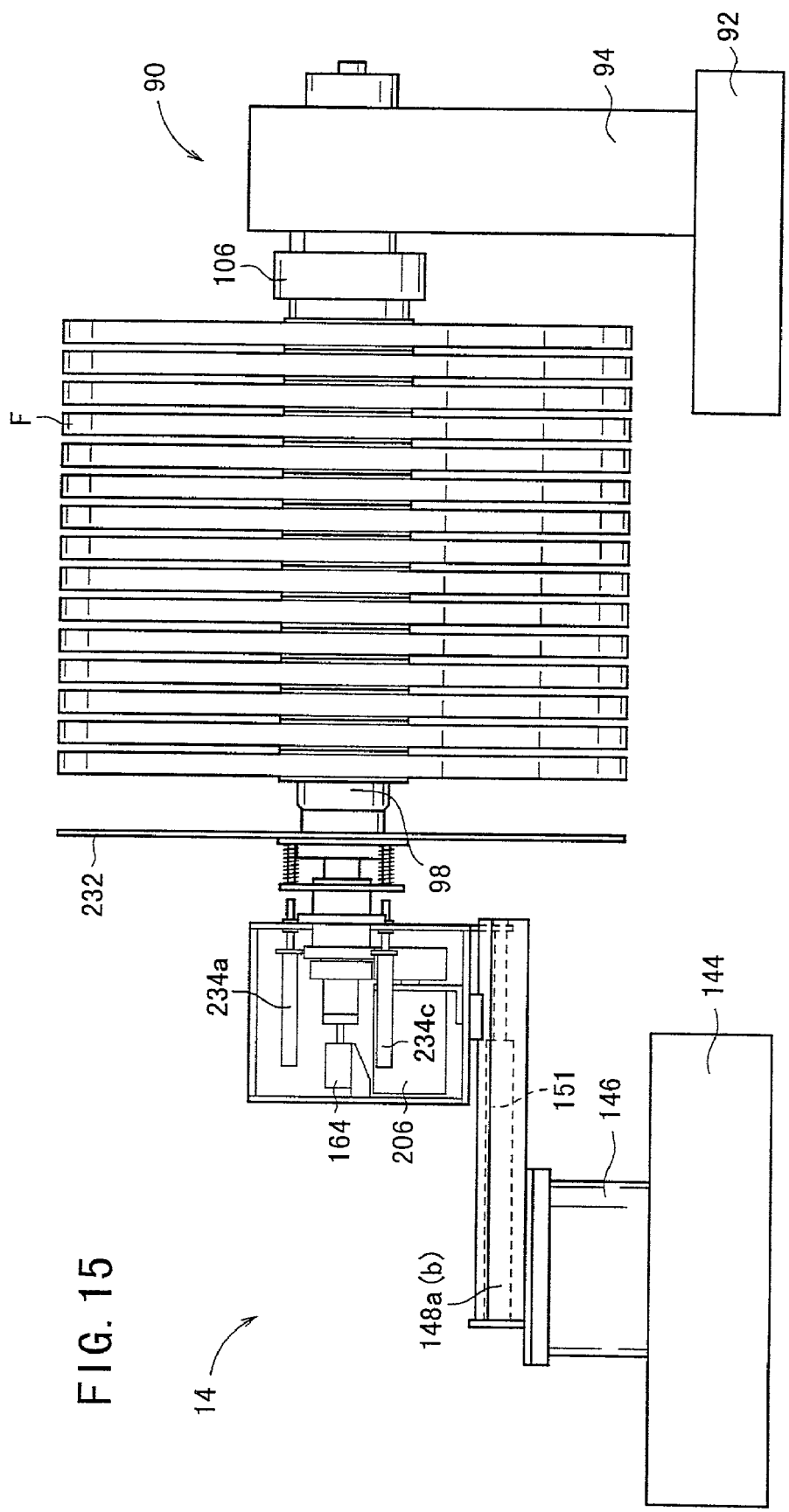
FIG. 15 is a side elevational view of the roll holding mechanism and the roll transferring apparatus which engage each other.
Figure 16:
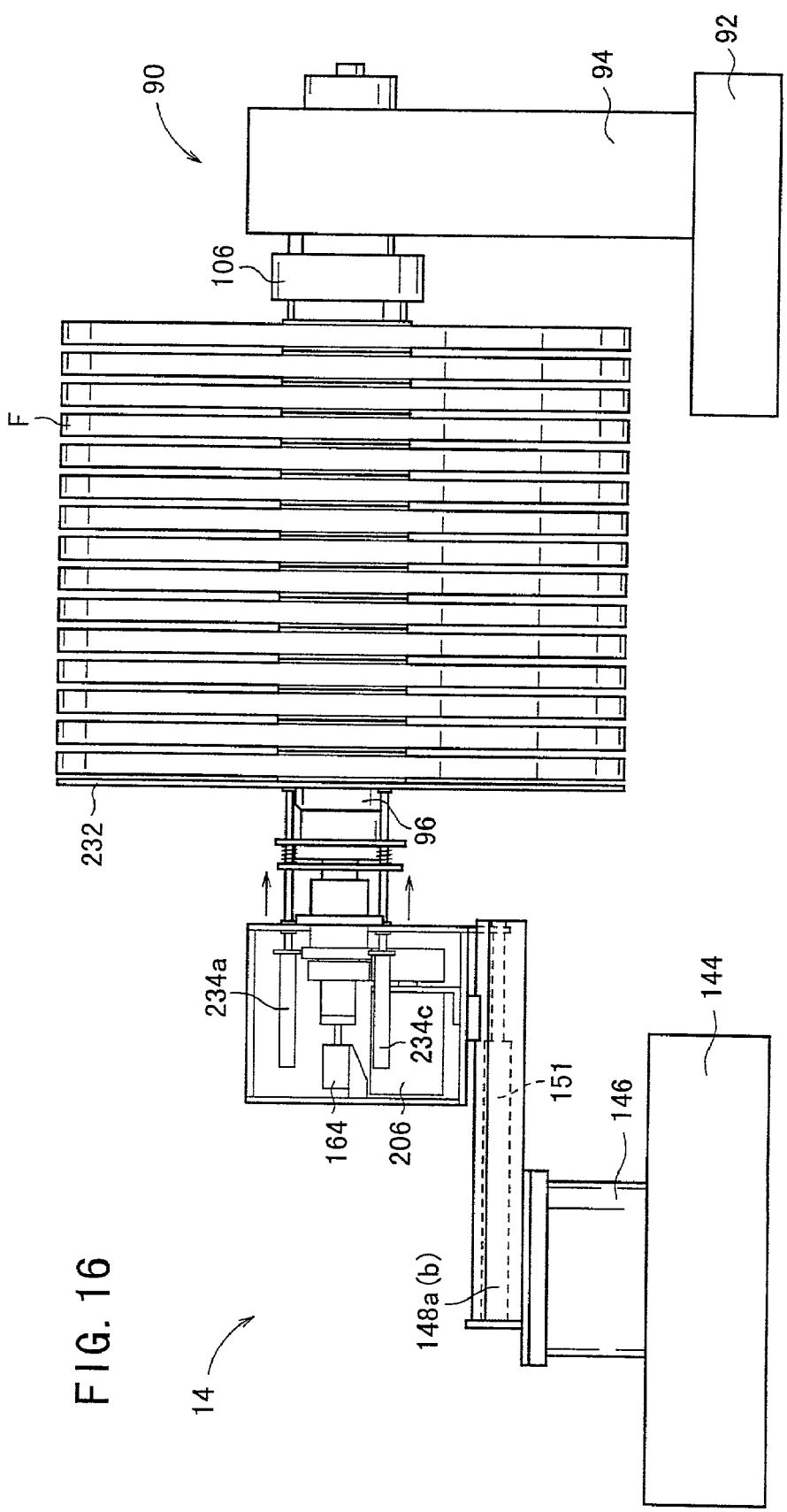
FIG. 16 is a side elevational view of the roll holding mechanism and the roll transferring apparatus, showing a support plate in the roll transferring apparatus which is displaced toward the roll holding mechanism.
Figure 17:
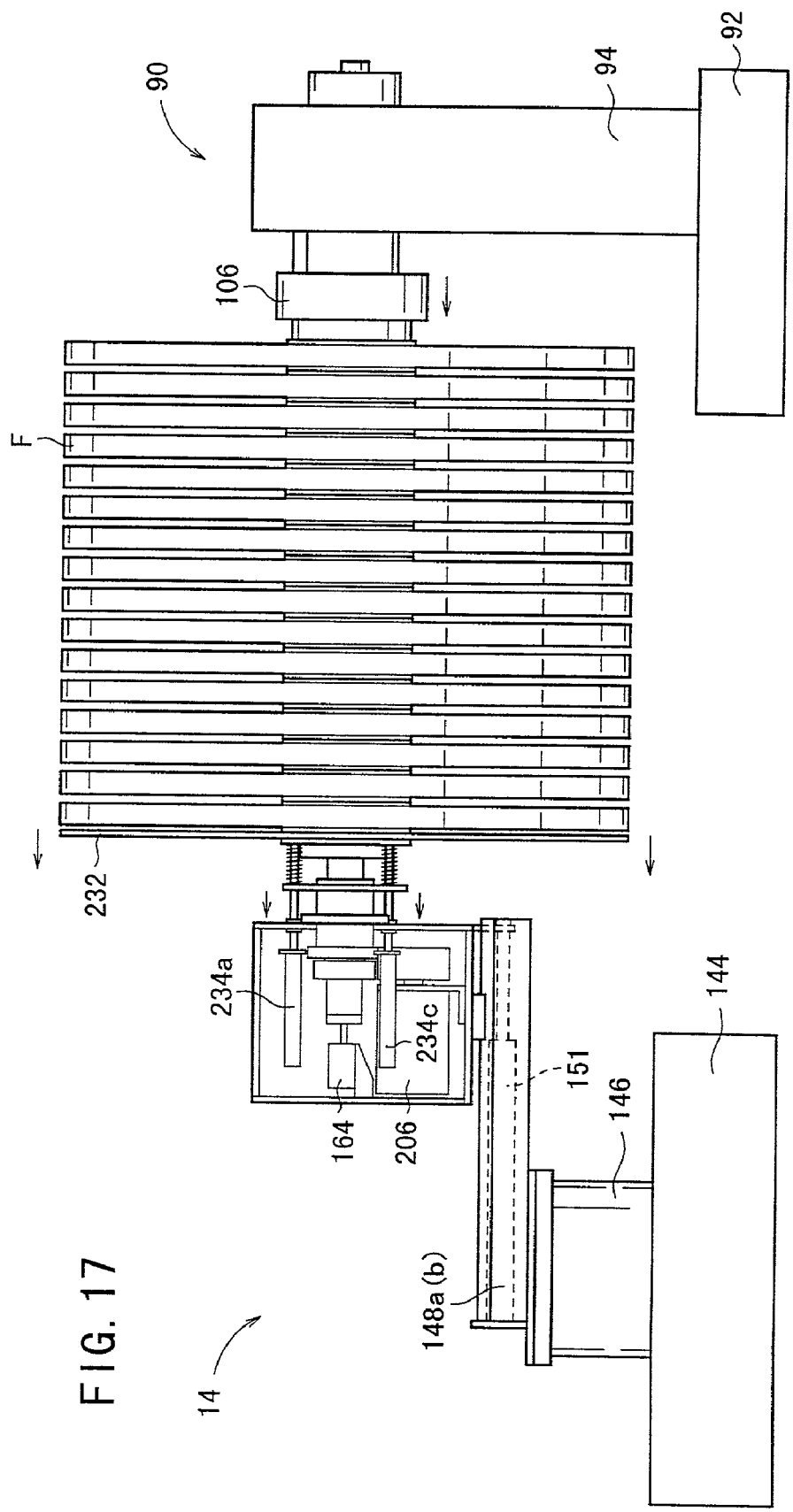
FIG. 17 is a side elevational view of the roll holding mechanism and the roll transferring apparatus which engage each other, showing the manner in which rolls are transferred to the roll transferring apparatus.
Figure 18:
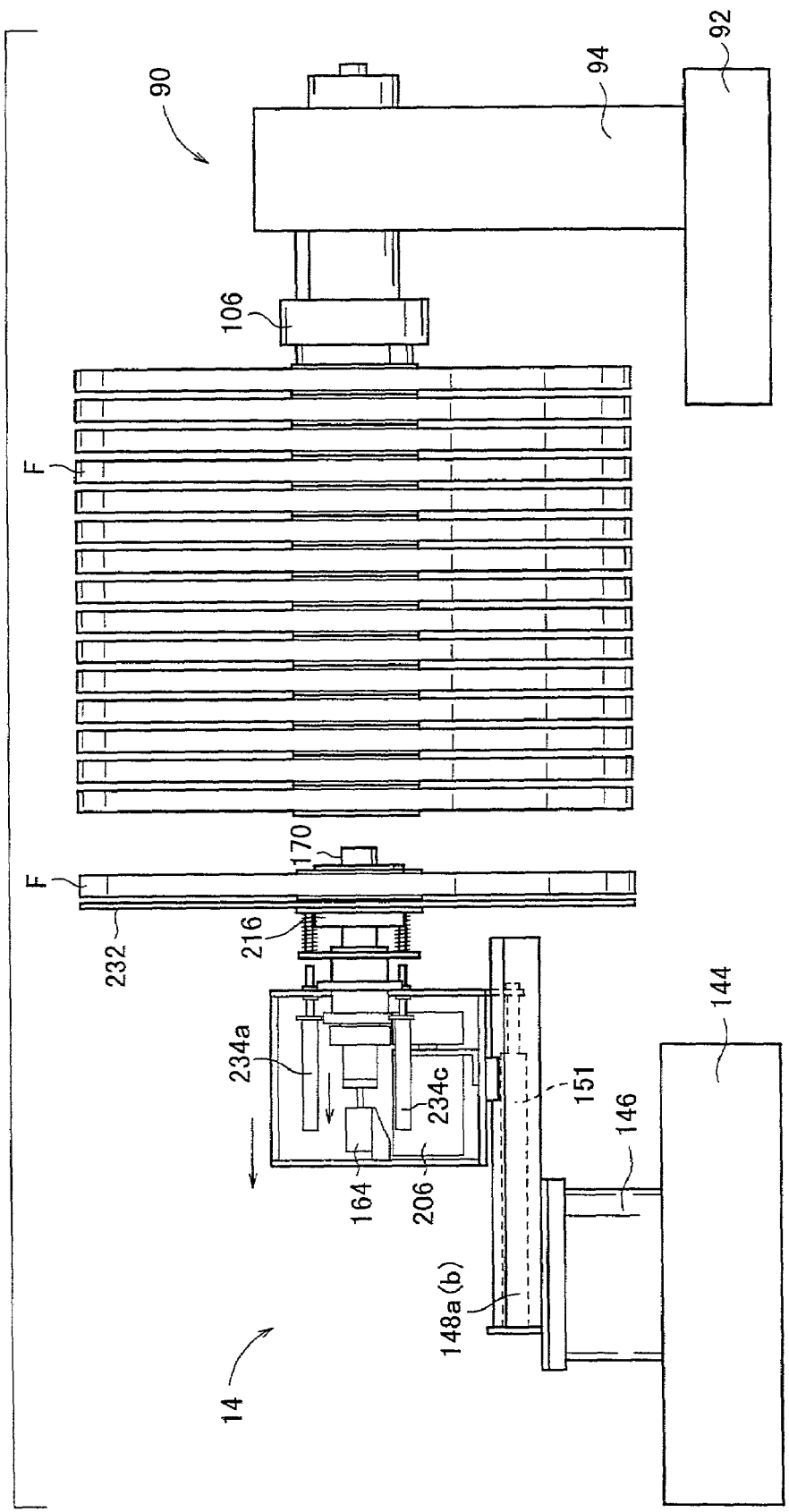
FIG. 18 is a side elevational view of the roll holding mechanism and the roll transferring apparatus which disengage from each other, with rolls being loaded on the roll transferring apparatus.

First, the cylinder 151 is actuated to move the roll transferring apparatus 14 along the guide rails 148a, 148b toward the roll holding mechanism 90 (see FIG. 14). After the roll transferring apparatus 14 has moved a given distance, the second cylinder 164 is actuated to displace the piston rod 166 toward the roll holding mechanism 90. At this time, the casing 202 and the gear 204 are displaced toward the roll holding mechanism 90, and the Oldham's coupling mechanism 170 on the tip end of the rotatable shaft 156 is also displaced toward the roll holding mechanism 90 (see FIG. 10).

When the Oldham's coupling mechanism 170 is displaced a given distance, the tip end of the sleeve 176 abuts against the plate member 126 disposed on the tip end of the roll retainer shaft 96. Upon a further displacement of the Oldham's coupling mechanism 170, the sleeve 176 pushes the plate member 126 along the inner circumferential surface of the roll retainer shaft 96 toward the support column 94. At this time, the cam 114 coupled to the plate member 126 by the rods 124a through 124d moves from the position shown in FIG. 7 toward the support column 94. When the cam 114 is moved a given distance, the rollers 134a, 134b on the ends of the lock arms 132a, 132b move from the smaller-diameter surface 118 along the cam surface 120 onto the larger-diameter surface 116 (see FIG. 8). As a result, the lock arms 132a, 132b are turned about respective shafts 133a, 133b on the support 108 under the tension of the springs 142a, 142b, retracting the fingers 136a, 136b radially inwardly into the roll retainer shaft 96. The rolls F are now unlocked from the roll retainer shaft 96 (see FIG. 15). The rotary ring 225 mounted on the roll loading shaft 216 is held against the tip end of the roll retainer shaft 96.

When the plate member 126 is displaced a given distance, the engaging member 112 on the tip end of the ball screw 98 is exposed through the opening 128 in the center of the plate member 126 toward the Oldham's coupling mechanism 170 (see FIG. 8). The slide element 174 of the Oldham's coupling mechanism 170 engages the engaging member 112 (see FIG. 11). At this time, the slide element 174 and the engaging member 112 are generally not in engagement with each other.

The motor 206 of the roll transferring apparatus 14 is energized to cause the drive shaft 208 to rotate the gear 210. Upon rotation of the gear 210, the gear 204 held in mesh therewith is also rotated. The rotation of the gear 204 is transmitted through the third sleeve 199, the second sleeve 194, the first sleeve 192, and the gear 212 to the rotatable shaft 156 with the spline portion 214 thereon. When the rotatable shaft 156 is rotated, the hub 172 and the slide element 174 of the Oldham's coupling mechanism 170 are rotated. When the slide element 174 is rotated a certain angle, the groove 182 in the slide element 174 is aligned with the engaging member 112 and receives the engaging member 112 therein (see FIG. 12). Upon rotation of the rotatable shaft 156, the roll loading shaft 216 is also rotated. However, since the rotary ring 225 on the tip end of the roll loading shaft 216 is rotatably held against the tip end of the roll retainer shaft 96, the roll retainer shaft 96 is not excessively worn.

Even if the axis of the rotatable shaft 156 and the axis of the ball screw 98 are not in full alignment with each other, since the slide element 174 is displaceable with respect to the hub 172 within a movable range provided by the sleeve 176 for preventing dislodgment, the engaging member 112 reliably engages in the groove 182.

With the roll transferring apparatus 14 and the roll holding mechanism 90 being coupled to each other, the cylinders 234a through 234c of the roll transferring apparatus 14 are actuated to cause their piston rods 236a through 236c to press the holder plate 224. When the holder plate 224 is pressed, the rods 230a through 230c and the support plate 232 are displaced along the outer circumferential surface of the roll loading shaft 216 toward the roll holding mechanism 90, closely to the rolls F (see FIGS. 16 and 19).

When the rotatable shaft 156 is further rotated with the engaging member 112 engaging in the groove 182, the engaging member 112 rotates the ball screw 98. Rotation of the ball screw 98 causes the nut 102 threaded over the rear end portion thereof to move the moving member 106 along the roll retainer shaft 96 toward the roll transferring apparatus 14. The moving member 106 pushes the core 97 of the roll F closest to the support column 94, displacing the rolls F toward the roll transferring apparatus 14.

Figure 19:
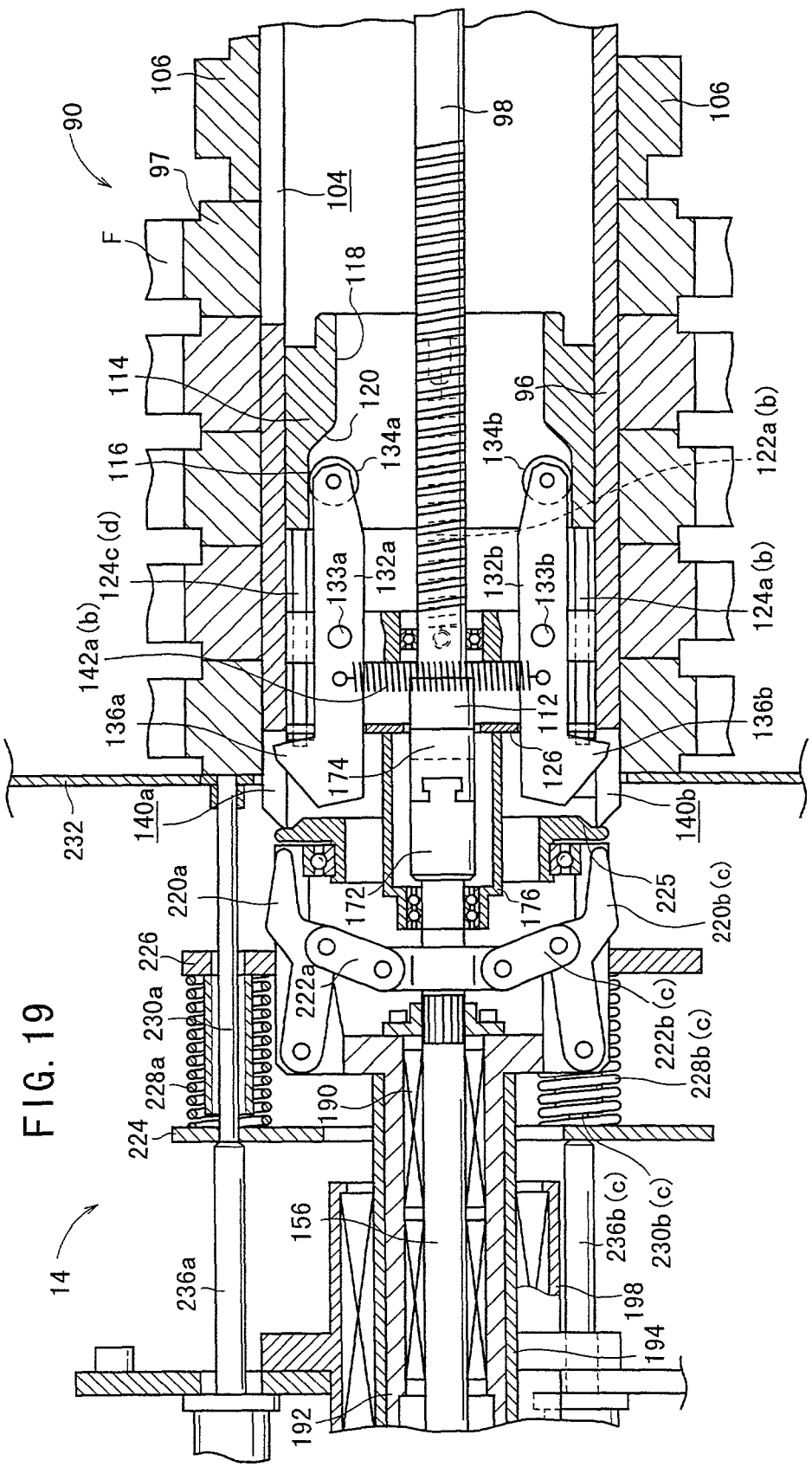
FIG. 19 is a cross-sectional view showing the manner in which the roll holding mechanism in the roll supply carriage and the Oldham's coupling in the roll transferring apparatus engage each other.

At this time, the tip ends of the rods 230a through 230c are held against the core 97 of the roll F on the tip end of the roll retainer shaft 96, and the support plate 232 is disposed in the vicinity of the roll F, as shown in FIG. 19. The cylinders 234a through 234c retract the rods 230a through 230c and the support plate 232 in synchronism with the movement of the moving member 106 by the roll holding mechanism 90. As a result, the core 97 of the roll F is supported by the tip ends of the rods 230a through 230c, and is moved toward the roll transferring apparatus 14 while being prevented from collapsing by the support plate 232 and without being skewed, and loaded onto the roll loading shaft 216 (see FIG. 17). Since the diameter of the roll loading shaft 216 is smaller than the diameter of the roll retainer shaft 96, even if the roll loading shaft 216 is slightly out of axial alignment with the roll retainer shaft 96, the roll F can be transferred from the roll retainer shaft 96 onto the roll loading shaft 216 without fail (see FIG. 19).

If there is no danger for the rolls F being transferred to collapse, then since the rolls F are sufficiently prevented from being skewed by holding the cores 97 thereof, the support plate 232, for example, may be fixed to the holder plate 226, and only the rods 230a through 230c may be brought into abutment against the cores 97 for synchronous displacement.

Figure 20:
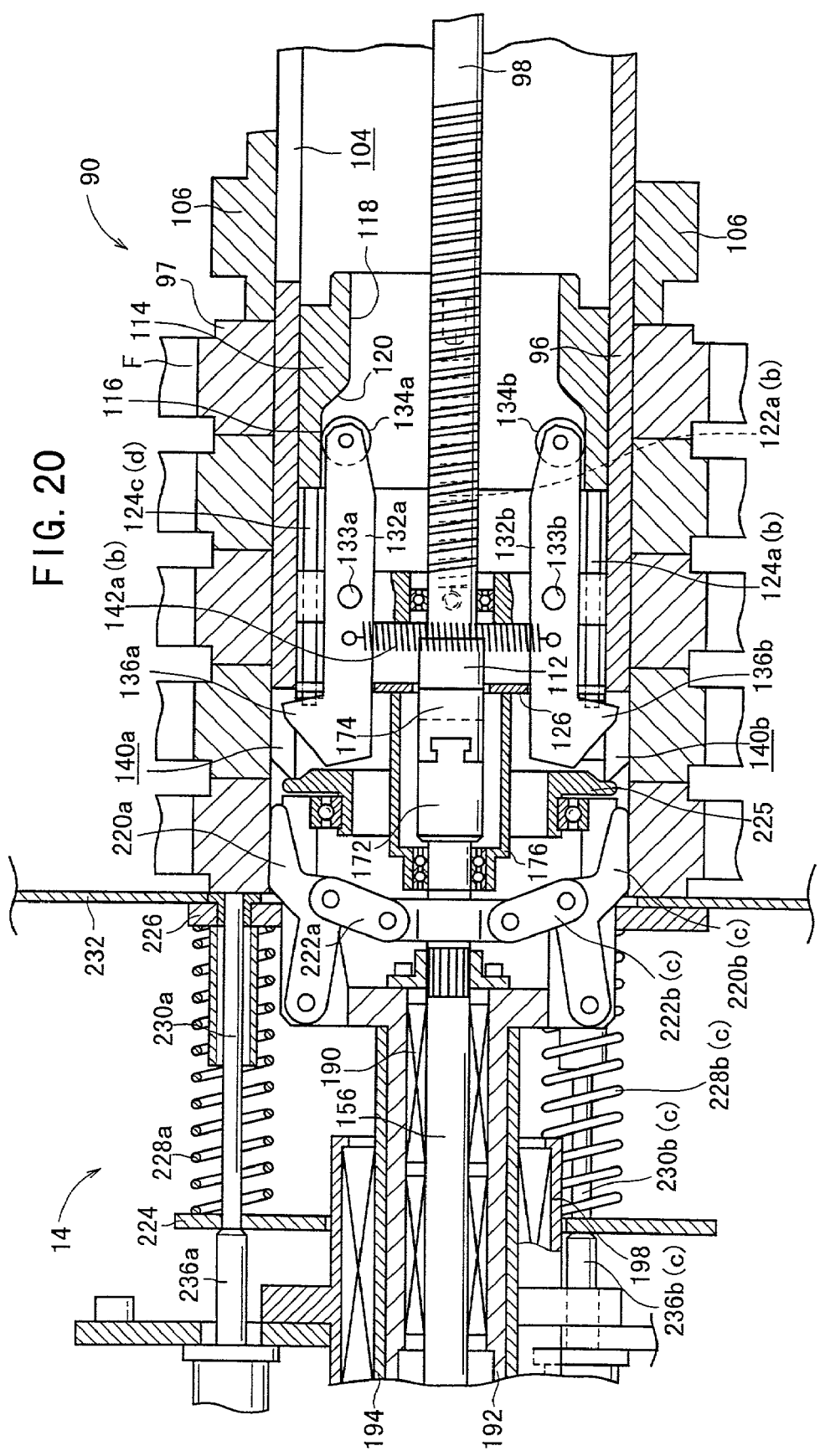
FIG. 20 is a cross-sectional view showing the manner in which rolls are transferred to a roll loading shaft in the roll transferring apparatus.

After one roll F has been transferred onto the roll loading shaft 216, the first cylinder 160 is actuated. The piston rod 162 and the coupling 158 displace the rotatable shaft 156 toward the roll holding shaft 90, causing the links 222a through 222c to displace the finger members 220a through 220c from the respective recesses 218a through 218c radially outwardly of the roll loading shaft 216. As a consequence, the roll F is fixed to the roll loading shaft 216 by the core 97 (see FIG. 20).

When one roll F is loaded on the roll transferring apparatus 14, the second cylinder 164 is actuated to retract the roll loading shaft 216, separating the roll transferring apparatus 14 and the roll holding mechanism 90 from each other. Then, the cylinder 151 is actuated to retract the roll transferring apparatus 14 as a whole (see FIG. 18). Thereafter, the rotary table 146 is turned to supply the roll F to a given region in the film manufacturing apparatus 12.

On the roll supply carriage 10, the plate member 126 is returned to the tip end of the roll retainer shaft 96 under the tension of the springs 122a, 122b, and the cam 114 is returns to its original position. The lock arms 132a, 132b are angularly moved, displacing the fingers 136a, 136b through the respective slots 140a, 140b radially outwardly of the roll retainer shaft 96. The roll F which has been moved to the tip end of the roll retainer shaft 96 is held in position by the core 97 against unwanted dislodgment from the roll retainer shaft 96.

In the above embodiment, the ball screw 98 and the nut 102 are used as a mechanism for removing the roll F from the roll holding mechanism 90. However, the moving member 106 held against the rear end of the roll F may be directly moved by a mechanism in the roll transferring apparatus 14 for removing the roll F from the roll holding mechanism 90.

After having supplied the roll F to the given region in the film manufacturing apparatus 12, the roll transferring apparatus 14 brings the roll loading shaft 216 into engagement with the roll retainer shaft 96 of the roll holding mechanism 90 for transferring a next roll F.

For separating the roll supply carriage 10 from the film manufacturing apparatus 12 with the rolls F remaining on the roll retainer shaft 96, the roll loading shaft 216 is brought into engagement with the roll retainer shaft 96, and thereafter the ball screw 98 is rotated through the Oldham's coupling mechanism 170 to retract the moving member 106. At the same time, the rods 230a through 230c are pushed toward the roll holding mechanism 90 to displace the roll F positioned on the tip end of the roll retainer shaft 96 deeply into the roll supply carriage 10 (see FIG. 19). Then, the roll loading shaft 216 is spaced away from the roll retainer shaft 96, whereupon the fingers 136a, 136b project radially outwardly from the roll retainer shaft 96 to hold the roll F against dislodgment. The above operation may be used to return a roll F held by the roll transferring apparatus 14 to the roll supply carriage 10.

Although a certain preferred embodiment of the present invention has been shown and described in detail, it should be understood that various changes and modifications may be made therein without departing from the scope of the appended claims.

What is claimed is:

1. A method of transferring a roll, comprising the steps of:
   bringing a roll loading shaft into engagement with a roll retainer shaft which holds a plurality of rolls thereon;
   releasing said rolls from being held on said roll retainer shaft;
   supporting one of said rolls;
   moving and transferring said supported one of the rolls along said roll retainer shaft onto said roll loading shaft; and
   fixing said one of the rolls to said roll loading shaft,
   wherein a tip end of said roll retainer shaft is pressed by a tip end of said roll loading shaft to release said rolls from being held on said roll retainer shaft under pressing forces, and
   wherein a mechanism associated with said roll retainer shaft is actuated by a rotating action of a mechanism associated with said roll loading shaft to move said rolls along said roll retainer shaft.

2. An apparatus for transferring a roll held on a roll supply carriage, comprising:
   a roll loading shaft for engaging a roll retainer shaft of said roll supply carriage which holds a plurality of rolls;
   releasing means for releasing said rolls from being held on said roll retainer shaft, said releasing means having a pressing member disposed at an axial center of said roll loading shaft for pressing an axial center of said roll retainer shaft to release said rolls from being held on said roll retainer shaft;
   transferring means for moving and transferring one of the rolls along said roll retainer shaft onto said roll loading shaft, said transferring means comprising engaging means disposed at an axial center of said roll loading shaft for engaging a ball screw disposed at an axial center of said roll retainer shaft and rotating means for rotating said engaging means of said roll loading shaft thereby to rotate said ball screw of said roll retainer shaft; and
   fixing means for fixing said one of the rolls to said roll loading shaft, wherein said one of the rolls held on said roll retainer shaft is transferred onto said roll loading shaft by a nut which moves upon rotation of said ball screw.

3. An apparatus according to claim 2, further comprising:
a support member mounted on said roll loading shaft for abutting against a side of said one of the rolls thereby to support said one of the rolls; and
support member displacing means for displacing said support member along said roll loading shaft.

4. An apparatus according to claim 2, wherein said engaging means comprises an Oldham's coupling mechanism.

5. An apparatus according to claim 4, wherein said Oldham's coupling mechanism comprises:
a hub rotatable by said rotating means;
a slide element slidable in a direction substantially perpendicular to a rotatable shaft of said hub; and
a sleeve disposed around said hub and said slide element for limiting a range in which said slide element is slidable with respect to said hub,
said slide element engaging said ball screw.

6. An apparatus according to claim 2, wherein said fixing means has a plurality of finger members displaceable toward an outer circumferential surface of said roll loading shaft to hold an inner circumferential surface of said one of the rolls.

7. A roll supply carriage comprising:
a roll retainer shaft for holding a roll thereon;
fixing means disposed on a tip end of said roll retainer shaft for fixing said roll to said roll retainer shaft;
a switching mechanism for selectively holding said roll in a fixed state achieved by said fixing means and releasing said roll from a fixed state achieved by said fixing means; and
a moving mechanism for moving said roll along said roll retainer shaft,
wherein said moving mechanism is operable to be actuated by a rotating action of a driving mechanism associated with a roll loading shaft toward which said roll is moved.

8. A roll supply carriage according to claim 7, wherein said fixing means has finger members displaceable toward an outer circumferential surface of said roll retainer shaft for engaging said roll.

9. A roll supply carriage according to claim 7, wherein said switching mechanism comprises:
a cam for bringing said fixing means selectively into a position to hold said roll and a position to release said roll; and
displacing means for displacing said cam.

10. A roll supply carriage according to claim 9, wherein said displacing means is disposed on a tip end of said roll retainer shaft and movable along said roll retainer shaft thereby to displace said cam.

11. A roll supply carriage according to claim 7, wherein said moving mechanism comprises:
a ball screw disposed at an axial center of said roll retainer shaft; and
a nut threaded over said ball screw,
said roll is moved by being pushed by said nut.

12. A roll supply carriage according to claim 7, wherein said roll is made of a photosensitive material and is accommodated in a light-shielded case having a labyrinth structure and a shutter for loading said roll into and unloading said roll out of said case.

* * * * *